(No Model.)
J. MUNTON.
CAR WHEEL.
No. 319,838.  Patented June 9, 1885.
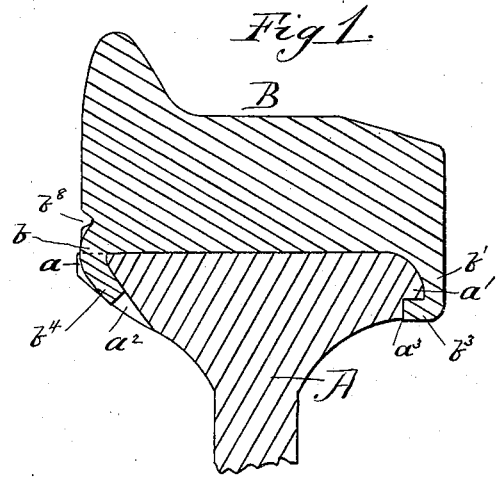
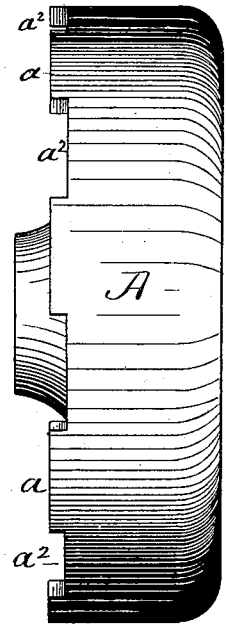
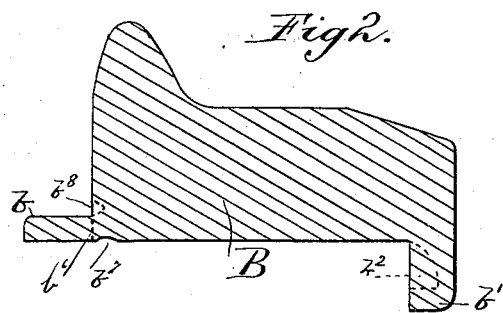
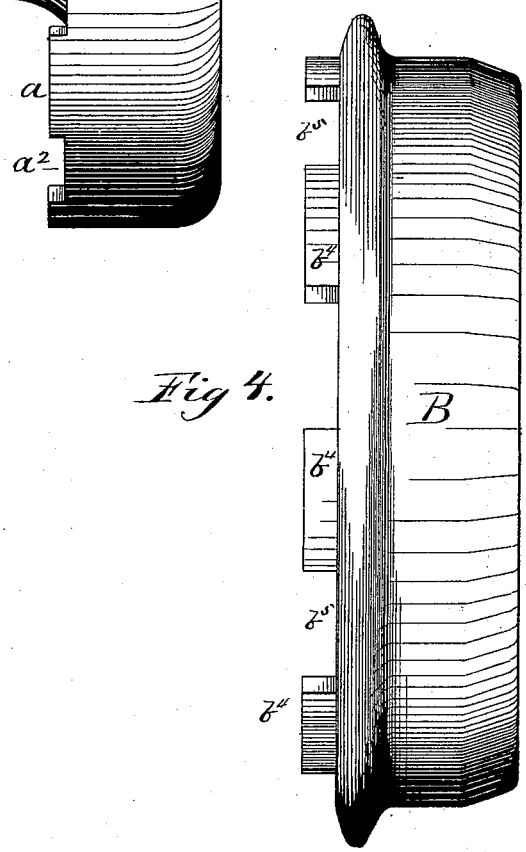
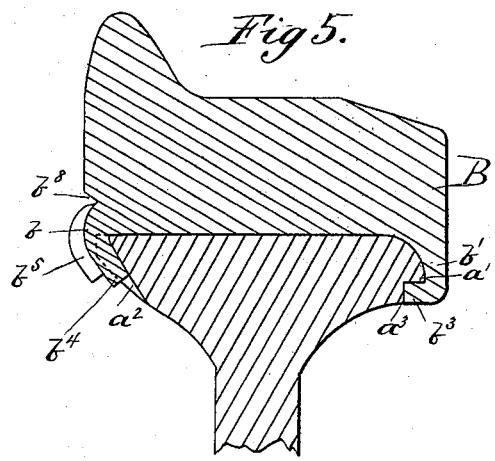
Witnesses:
Taylor E. Brown
H. W. Munday
Inventor:
James Munton
By Munday, Evarts and Adcock
his Attorneys

UNITED STATES PATENT OFFICE.

JAMES MUNTON, OF MAYWOOD, ILLINOIS, ASSIGNOR TO THE MUNTON CAR WHEEL COMPANY, OF SAME PLACE.

CAR-WHEEL.

SPECIFICATION forming part of Letters Patent No. 319,838, dated June 9, 1885.

Application filed January 5, 1885. (No model.)

*To all whom it may concern:*

Be it known that I, JAMES MUNTON, a citizen of Great Britain, residing at Maywood, in the county of Cook and State of Illinois, have invented a new and useful Improvement in Car-Wheels, of which the following is a specification.

This invention relates to car-wheels having steel tires and cast-iron centers.

The object of my invention is to provide a simple, cheap, and efficient means of securing the center and tire together, so that the tire can neither slip when heated and expanded by application of the brakes, nor the wheel collapse in case the tire should break, as such tires are more or less liable to do when they become worn too thin, and at the same time to avoid the use of bolts or like devices, which not only tend to weaken the tire, but are liable to get loose, and which also greatly increase the cost and labor of making the wheel. To this end I roll the tire with two projecting rims or webs, one at each edge of the tire, one projecting at right angles to the inner face of the tire, and the other parallel or on a line therewith. The right-angle flange or web is grooved to receive one edge of the center, and the other edge of the center is provided with recesses or notches, into which portions of the parallel or horizontally-projecting web are turned, thus not only holding the tire on the center, but preventing its slipping thereon.

In the accompanying drawings, which form a part of this specification, and in which similar letters of reference indicate like parts, Figure 1 is a partial central section of a wheel embodying my invention. Fig. 2 is a similar view of the tire as rolled. Fig. 3 is an elevation of the center. Fig. 4 is a similar view of tire; and Fig. 5 is a sectional view showing a modification, wherein the alternate or intermediate portions of the horizontally-projecting web are turned down over the edge of the center, as well as those portions which fit in the recesses therein.

In said drawings, A represents the cast center of the wheel, and B the rolled steel tire fitting thereon. The center has two projecting edges, $a$ and $a'$, in the former of which a number of recesses or notches, $a^2$, are provided, thus giving the center an irregular edge. The tire B is provided with a web or rim, $b$, projecting on a line with the inner face of the tire from the flange side of the tire, and another web or rim, $b'$, at its opposite edge projecting at right angles to its inner face. The right-angle web $b'$ is furnished with a groove, $b^2$, to receive the edge $a'$ of the center, and this edge of the center has a shoulder, $a^3$, to fit the extreme point, $b^3$, of the web. Portions $b^4$ of the horizontally-projecting rim $b$ are turned down over the edge of the center into the corresponding recesses, $a^2$. The intermediate portions, $b^5$, of this web may be either entirely cut away, as shown in Fig. 1, and as indicated by the dotted line $b^6$ in Fig. 2, or they may be turned down over the edge of the center, as shown in Fig. 5. The latter construction affords additional strength.

To facilitate the turning down of the lips or portions $b^4$ of the web, I provide a shallow groove, $b^7$, on the inner face of the tire at the point where the chief curve is made. This groove may be formed in the tire at the time it is rolled. Another groove, $b^8$, preferably of a V shape, is cut in the edge of the tire just above the web $b$, which serves to increase the width of the web and to bring the lips $b^4$, when turned down, within the line of the flange edge of the tire.

The form of the tire as rolled is shown in Fig. 2, the grooves $b^2$ and $b^8$ (indicated in said figure by the dotted lines) being cut in the tire after it is rolled. The center may of course be cast in the desired form, as shown.

I claim—

1. The car-wheel consisting of the center having two projecting edges, one of which is irregular or recessed, and a steel tire having webs fitting over the edges of said center, portions of one of said webs being bent down into said recessed edge, substantially as specified.

2. The center A, having edges $a$ and $a'$, said edge $a$ provided with recesses $a^2$, in combination with tire B, having grooved web $b'$, and web $b$, furnished with groove $b^7$, portions of said web $b$ being turned down into said recesses, substantially as specified.

3. The combination, with a center having a recessed edge, of a tire fitting on the same and having lips or projecting portions turned down into said recessed edge, substantially as specified.

JAMES MUNTON.

Witnesses:
H. M. MUNDAY,
EDMUND ADCOCK.